United States Patent [19]

Bannon et al.

[11] Patent Number: 4,640,743
[45] Date of Patent: Feb. 3, 1987

[54] MULTI-STAGE CONDENSATION PROCESS

[75] Inventors: Robert P. Bannon; Stanley Marple, both of Houston, Tex.

[73] Assignee: Shell Oil Company, Houston, Tex.

[21] Appl. No.: 726,854

[22] Filed: Apr. 24, 1985

[51] Int. Cl.⁴ ............................................. B01D 3/14
[52] U.S. Cl. ........................................ 203/87; 203/1; 203/98; 203/DIG. 18; 202/181; 202/186; 202/196; 208/347; 208/349; 208/358; 159/DIG. 18
[58] Field of Search ............... 203/87, 1, 98, DIG. 18; 202/186, 182, 196, 185.1, 202, 181; 159/DIG. 18; 208/368, 358, 347, 349; 196/99, 139

[56] References Cited

U.S. PATENT DOCUMENTS

| 3,336,395 | 8/1967 | Price | 203/87 |
| 3,401,093 | 9/1968 | Cox | 203/87 |
| 3,475,288 | 10/1969 | Ezzell | 203/1 |
| 3,607,665 | 9/1971 | Rogers | 203/1 |
| 4,120,756 | 10/1978 | Carman | 203/11 |
| 4,235,706 | 11/1980 | Bannon | 203/87 |
| 4,484,983 | 11/1984 | Bannon | 203/87 |
| 4,484,984 | 11/1984 | Bannon | 203/87 |
| 4,484,985 | 11/1984 | Bannon | 203/87 |
| 4,484,986 | 11/1984 | Bannon | 203/87 |

Primary Examiner—S. Leon Bashore
Assistant Examiner—V. Manoharan
Attorney, Agent, or Firm—Ronald R. Reper

[57] ABSTRACT

A process for the multi-stage condensation of an overhead fraction is disclosed. The process facilitates optimal response to changes in distillation column controls wherein column top reflux condensation is preferentially returned to said distillation column, but auxiliary surge capacity is obtained by connection to a first accumulator section of an accumulating zone, which surge capacity is supplemented by one-way flow of liquid from a cooler, second section in said accumulation zone.

4 Claims, 1 Drawing Figure

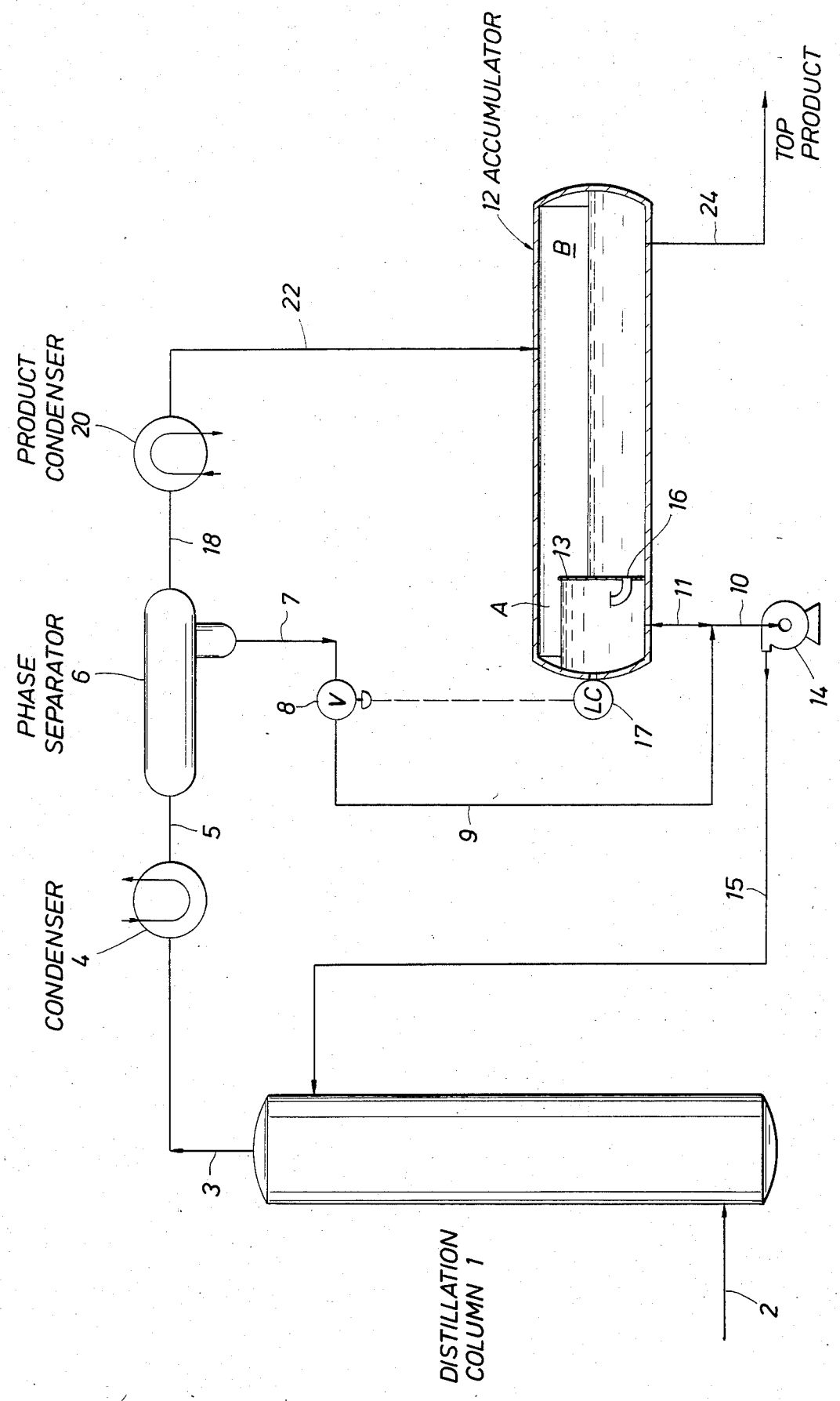

MULTI-STAGE CONDENSATION PROCESS

BACKGROUND OF THE INVENTION

Rapid escalation of energy costs in recent years has spurred efforts to improve efficiency in plant operations. Distillation practices have received great attention, since the process of distillation, the predominant unit operation in the oil refining and chemical industries, consumes prodigious amounts of energy.

One energy-saving procedure is the practice of multiple stage, e.g., two-stage, condensation of the overhead vapors from a distillation column. Multi-stage condensation procedures allow energy savings by permitting the use of higher temperatures at which heat may be removed from the overhead vapor. Such a process is described, for example, in U.S. Pat. No. 3,320,159. In at least one two-stage procedure for condensation of distillation column overhead vapors, the first stage of condensation is operated under conditions to condense just enough liquid to provide reflux for the distillation column, and the second stage of condensation is operated under conditions to provide the top product of the column. For two-stage condensation to be of value in heat recovery, the vapor or top product from the distillation column must be a multi-component mixture, and there must be a reasonable temperature spread between its dew point and bubble point, e.g., 20° F. Most hydrocarbon distillations fit this requirement.

A very common commercial process for which two-stage condensation can be helpful is the separation of gasoline boiling range materials (often 400° to 430° F. ASTM end point) as the top product from a feed containing also kerosene, jet fuel and gas oil components. The present process is particularly useful for separating $C_5$ to +450° F. boiling range naphtha into low boiling and higher boiling fractions, e.g., deisohexanizing naphtha.

The present invention is directed to a process to improve the distillation column control in order to minimize the consumption of energy. It takes less energy to effect a separation by distillation if the multicomponent compositions of the product streams are held constant compared to the energy required to accomplish the same separation where the product compositions average out to the desired value, but fluctuate widely above and below the desired value during the course of the distillation.

Most distillation columns have an accumulator vessel for condensed overhead vapor to serve as a surge volume for reflux and top products. The composition inertia of the liquid inventory in the accumulator results in lag time which dampens swings in the column overhead vapor composition. This lag time detrimentally affects the responsiveness of the distillation control system to minimize fluctuation in the composition of the distillate product. That is, the composition of the accumulator may vary from the composition of the condensed liquid to the accumulator, making sharp control of the distillation column by use of the accumulator liquid much more difficult. Accordingly, a need has existed for a process which would provide the advantages of multistage condensation heat recovery and/or lower condenser cost and of sharpened control of the distillation process without sacrificing the surge volume required for smoothing flows and protecting pumps employed in the process. The present invention satisfies that need.

A number of patents have recently issued concerning improvements in the condensation process employing an accumulation zone sectioned by a barrier which provides limited flow of liquid between the sections. These include U.S. Pat. Nos. 4,235,706; 4,484,983; 4,484,984; 4,484,985 and 4,484,986, incorporated herein by reference.

SUMMARY OF THE INVENTION

The invention, therefore, is a process which comprises:

(a) distilling a multi-component liquid in a distillation column, (b) condensing a first portion of the overhead fraction in a first condensation zone;

(c) passing vapor and liquid from the first condensation zone and separating said vapor and said liquid in a separation zone;

(d) passing a first portion of said liquid from the separation zone to the upper portion of said distillation column to contact said overhead fraction;

(e) accumulating a second portion of said liquid from the separation zone in a first accumulation section of an accumulating zone, said accumulating zone also comprising a second accumulation section having vapor communication with the first accumulation section but being separated from said first accumulation section by a barrier which provides for one way flow of liquid from the second accumulation section to the first accumulation section near or at the bottom of said barrier, the first accumulation section and the second accumulation section being at different temperature;

(f) passing said vapor from the separation zone to a second condensation zone at a lower temperature than in the first condensation zone to form a liquid and passing the condensed liquid to the second accumulation section of the accumulating zone, and, (g) controlling the flow of liquid from said separation zone to said first accumulation section so as to minimize flow of liquid from said second accumulation section to said first accumulation section.

The invention may be applied to any distillation process employing multi- or two-stage condensation. For example, the invention may be employed in crude oil distillation processes, and distillation of products from conversion processes such as catalytic cracking, hydrocracking, and delayed coking. The invention is preferably utilized in distillation processes in which the top product separated is a light gasoline fraction. When the condenser system is to be designed for heat recovery, also the top product should be a mult-component mixture, and there should be a reasonable temperature differential, say at least 20° F. preferably from 20° F. to 225° F. between its dew point and bubble point. The particular conditions applied, i.e., pressure, temperature, throughput, etc., are those applicable to multi- or two-stage condensation, and are well understood by those skilled in the art. Again, condensation need not be completed in the second condensation zone, as will be apparent to those skilled in the art, and provision may also be made for removal of non-condensables. Preferably, the condensation is substantially completed in this stage.

DETAILED DESCRIPTION OF THE INVENTION

In order to describe the invention in greater detail, reference is made to the accompanying drawing. The single FIGURE illustrates diagrammatically a distillation and two-stage condensation procedure representative of the invention. As illustrated, an accumulation zone is provided which is divided into two sections by a barrier structured to allow unrestricted vapor flow between the sections, and one way flow from the downstream, second accumulation section to the upstream, first accumulation section. In the embodiment shown, the liquid-vapor stream from the first condensation stage is phase separated to pass at least a major portion of the condensed liquid to the first accumulation section of the accumulating zone. Numeral (1) designates a distillation column, preferably a fractionating column for a light naphtha top product e.g., a deisohexanizer. The feed enters column (1) through line (2), and is fractionated in a known fashion. Overhead vapor exits column (1) through line (3) at a temperature of about 190° F. and is passed to condenser (4) where a portion of the vapor is condensed. The amount condensed is that amount sufficient to provide reflux for column (1), while at the same time providing a high temperature difference between the condensing vapor and the cooling medium to reduce the condenser size required. The amount required for adequate reflux of the distillation column may be readily determined by those skilled in the art. It is an advantage of the invention that surge volume required for smoothing flows and protecting pumps is provided while essentially eliminating problems of controlling the distillation attributable to lag time and/or dead time associated with conventional accumulator operation.

Any suitable type of condensation or heat exchange system may be employed, as will also be evident to those skilled in the art. It is preferred that the vapor be partially condensed either by indirect heat exchange with another process stream, air or cooling water, or by direct contact with condensate that has been cooled by exchange.

From condenser (4), the vapor liquid stream is passed via line (5) to phase separator (6) where the liquid separates out and a major portion, or all of the liquid passes via line (7), level control valve (8) and lines (9) and (10) pump (14) and line (15) to the distillation column (1) as reflux. A portion of the liquid from line (9) passes via line (11) to the accumulating zone (12). As will be apparent to those skilled in the art, the separation zone may be integral with, and mechanically part of the first condensation zone. The external design of the accumulating zone (12) may vary considerably, but the critical feature therein is the provision of a barrier (13) which divides the zone into two separate liquid containing sections, there being only one-way liquid flow from the downstream, cooler section (B) into the upstream hotter section (A) via one way control means such as e.g., a check valve (16). At the same time, barrier (13) is constructed so that it does not limit vapor flow in the accumulating zone (12). Accordingly, any vapor formed or entrained in line (11) enters the upstream, hotter accumulation section (A) of accumulating zone (12) and said vapor is free to occupy the entire open volume of said unit (12). The temperature of the liquid in section (A) will be approximately 175° F. A level controller (17) operatively connected to the liquid level in section (A) operatively controls valve (8) to permit greater or lesser flow of liquid in lines (9) and (11) so as to maintain a desired level of liquid in section (A). In a preferred embodiment, as shown in the figure, partition (13) divides the accumulation zone unequally such that the upstream hotter section (A) is sized smaller to minimize effect on reflux composition returned to the desired distillation operation. The larger section (B) is for top product as will be illustrated later. In yet another preferred embodiment, the liquid level in section (A) is controlled at a level higher than in section (B). This is accomplished by adjusting the flow of liquid via control valve (8) when condenser (4) condenses more liquid than is needed for return to the distillation column (1).

When not enough condensation for reflux is produced in the first condenser (4) level control valve (8) will be wide open and the liquid deficiency is made up by flow of liquid from section (B) through the partition check valve (16). In this situation the bulk of the liquid reflux is still flowing directly to the reflux pump (14) and the influence of liquid from sectin (B) is minimal on the responsiveness to conventional distillation control.

As will be apparent to those skilled in the art when the condenser (4) produces more liquid than needed for reflux it is desirable to have the excess liquid pass via line 18 through condenser (20) and line (22) into accumulation zone (12) in order to maintain a steady product temperature, to minimize vent gas flow if non-condensables are present, and to further smooth column control The level controller on section (A) accomplishes this.

From separator (6) vapor and, in normal operation, a minor portion of the liquid from condenser (4) is passed via line (18) to heat exchange or condensation zone (20). As will be apparent to those skilled in the art, pressure between line (18) and accumulator (12) will be equilibrated by means of a line (not shown). Condensation zone (20) may be operated to provide an outlet temperature of e.g., 110° F. As shown the condensate flows via line (22) to accumulating section (B) of zone (12) where the liquid separates out in sectin (B) formed by the walls of unit (12) and barrier (13). The vapor is free to occupy the entire volume of unit (12). If the vapor in line (22) contains a significant quantity of "non-condensables", the liquid-vapor stream from condensation zone (20) may be vented first (not shown) before the liquids are passed to section (B). Although the invention is designed primarily for "two stage" procedures in which the condensate from the second stage is top product, it will be apparent to those skilled in the art that any "non-condensables" from the second condensation stage (20) may be processed by conventional procedures. Although a minor portion of the vapor in the open spaces within accumulating zone (12) above section (B) will condense, such condensation is not of major significance.

As shown, the barrier which separates zone (12) into two sections is limited so that the section have open vapor communication to allow vapor flow and pressure equalization between the sections. Barrier (13) is provided with a check valve (16) near or at the bottom thereof for one way flow of liquid from the top product section (B) to the section (A) only when the liquid level in section (B) is higher than in section (A). Preferably during normal operations the amount of liquid in section (A) is controlled to maintain a level above the liquid level in section (B) so as reduce the periods when liquid will flow from section (B) into section (A). Top product may be drawn off through line (24).

The process of the invention provides distinct advantages over the prior procedure of utilizing a two section accumulating zone wherein the dividing barrier has an opening enabling two way flow of liquids between the compartments. The present invention essentially eliminates problems with controlling the distillation column as may be attributable to accumulator lag time enabling more precise, responsive control. This is especially important if very precise fractionation is required as e.g., in a deisohexanizer operation. The present invention further provides sufficient reflux liquid required for smoothing flows and overall operation and protecting pumps against disrupted flow.

What is claimed is:

1. A two-stage condensation process comprising:
   (a) distilling a multi-component liquid in a distillation column under conditions to provide an overhead fraction vapor;
   (b) condensing a portion of the overhead fraction vapor in a first condensation zone to obtain a liquid in addition to the partially cooled vapor;
   (c) passing said partially cooled vapor and liquid from the first condensation zone and separating said partially cooled vapor and said liquid in a separation zone;
   (d) passing a first portion of said liquid from the separation zone to the upper portion of said distillation column to contact said overhead fraction;
   (e) accumulating a second portion of said liquid from the separation zone in a first accumulation section of an accumulating zone, said accumulating zone also comprising a second accumulation section having vapor communication with the first accumulation section but being separated from said first accumulation section by a barrier which provides for one way flow of liquid from the second accumulation section to the first accumulation section in the lower portion of said barrier, the first accumulation section and the second accumulation section being at different temperature;
   (f) passing said partially cooled vapor from the separation zone to a second condensation zone at a lower temperature than the first condensation zone to form a condensed liquid and passing the condensed liquid to the second accumulation section of the accumulating zone, and;
   (g) controlling the flow of liquid from said separation zone to said first accumulation section so as to minimize the flow of liquid from said second accumulation section to said first accumulation section.

2. The process of claim 1, wherein step (g) the flow of the liquid to the first accumulation section is controlled to maintain a higher liquid level in said first accumulation section than the liquid level in said second accumulation section.

3. The process of claim 1 wherein step (a) the overhead fraction has a temperature differential of at least 20° F. between its dew point and bubble point.

4. The process of claim 1 wherein step (a) the multi-component liquid is a hydrocarbon.

* * * * *